United States Patent [19]

Robeson et al.

[11] Patent Number: 4,912,149

[45] Date of Patent: Mar. 27, 1990

[54] BLENDS OF POLY(VINYL ACETATE) AND POLY(PROPYLENE CARBONATE)

[75] Inventors: Lloyd M. Robeson, Macungie; Jeffrey A. Kuphal, Blandon, both of Pa.

[73] Assignee: Air Products and Chemicals, Inc., Allentown, Pa.

[21] Appl. No.: 313,774

[22] Filed: Feb. 22, 1989

[51] Int. Cl.$^4$ .................. C08L 91/04; C08L 69/00
[52] U.S. Cl. .................. 524/501; 524/502; 525/185; 525/187; 525/468; 525/469
[58] Field of Search ............. 525/185, 187, 468, 469; 524/501, 502

[56] References Cited

U.S. PATENT DOCUMENTS

| | | | |
|---|---|---|---|
| 4,137,382 | 1/1979 | Vetter, Jr. | 525/468 |
| 4,608,417 | 8/1986 | Giles, Jr. | 525/148 |
| 4,698,390 | 10/1987 | Robeson et al. | 525/133 |

OTHER PUBLICATIONS

O. Olabisi et al, "Polymer-Polymer Miscibility", Academic Press, 1979, pp. 238–239, New York.
F. Rodriguez, "Principles of Polymer Systems", McGraw-Hill Book Company, New York (1970), pp. 98–101, 403–405.
K. Saunders, "Poly(vinyl acetate) and Related Polymers", Organic Polymer Chemistry, pp. 104–115, Chapman and Hall, London (1973).
A. Rokicki et al, "The Application of Carbon Dioxide as a Direct Material for Polymer Syntheses in Polymerization and Polycondensation Reactions", Sci.-Rev. Macromol. Chem., C21(1), pp. 135–186 (1981).

*Primary Examiner*—Allan M. Lieberman
*Attorney, Agent, or Firm*—Mark L. Rodgers; William F. Marsh; James C. Simmons

[57] ABSTRACT

Polymeric compositions are provided which include blends of polymers of vinyl acetate and polymers of propylene carbonate. These polymer blends exhibit excellent mechanical compatibility and are useful in molding structures, such as films, or in compounded formulations, such as emulsions and adhesives. These blends exhibit enhanced toughness superior to either of the constituent polymers alone.

6 Claims, No Drawings

BLENDS OF POLY(VINYL ACETATE) AND POLY(PROPYLENE CARBONATE)

TECHNICAL FIELD

This invention relates to compositions which contain blends of poly(vinyl acetate) and poly(propylene carbonate). In another aspect the invention relates to molded structures, such as film, which are formed from these polymer blends.

BACKGROUND OF THE INVENTION

As polymer technology has progressed, the necessity to tailor properties of polymeric materials for particular end uses has increased. Such challenges have been met by using additives which enhance particular properties of the polymer without adversely affecting its other properties. Another approach is to combine various polymers to achieve a balance of properties which are exhibited differently by the parent polymers. Advantages gained by such blends may relate to processing, for example polymer rheology, or to the final blend performance such as in adhesion or toughness.

Most polymer blend combinations, however, have poor mechanical compatibility and in such cases the blends actually sacrifice mechanical advantages which are exhibited by each of the parent polymers. Tradeoffs are sometimes acceptable in order to achieve the desired balance for a particular use. Rarely do polymers combine in admixture to achieve properties which are actually superior in any way to those of the parent polymers making up the blend. The reason for this is that unless the polymers are very similar to one another in structure or exhibit specific interactions, they either will be incompatible and tend to separate over time or interfere with each other's performance and cause an unacceptable degradation in one or more of the properties which are desired.

Olabisi, et. al., *Polymer-Polymer Miscibility*, pages 238–9, Academic Press, NY (1979), presents a survey of miscible polymer systems which include poly(vinyl acetate) and vinyl acetate copolymers, such as a blend of poly(vinyl acetate) and poly(vinylidene fluoride) and a blend of poly(vinyl acetate) and poly(vinyl nitrate). Other combinations exhibited less homogeneity. Miscible systems involving polyesters and polycarbonates are also discussed, but there is no suggestion to combine poly(vinyl acetate) with poly(propylene carbonate).

U.S. Pat. No. 4,608,417, Giles, (1986), describes overcoming the problem of incompatibility of aromatic polycarbonates with olefin-containing polymers in multilayer compositions by using a tie layer formed by mixing an olefin acrylate with poly(4-methyl-pentene-1). There is no suggestion of blends involving either poly(vinyl acetate) or poly(propylene carbonate).

U.S. Pat. No. 4,698,390, Robeson, et al., (1987), describes a compatible blend of a vinyl chloride derived polymer and a polycarbonate having repeating units derived from bis-(3,5-dimethyl-4-hydroxyphenyl)sulfone. The vinyl chloride polymer can be a copolymer of at least 50 weight percent vinyl chloride and vinyl acetate. The polycarbonates disclosed are quite different from poly(propylene carbonate) and do not suggest blends of such polymers with poly(vinyl acetate).

Rodriguez, F., *Principles of Polymer Systems* p. 98–101, 403–405, McGraw-Hill, NY (1970), describes bulk and solution polymerization procedures in general and specifically discusses emulsion polymerization for poly(vinyl acetate).

Saunders, K. J. "Poly(vinyl acetate) and Related Polymers", *Organic Polymer Chemistry*, pages 104–115, Chapman and Hall, London, (1973), describes several different routes for preparing vinyl acetate monomer and discusses emulsion polymerization techniques for production of poly(vinyl acetate). The properties, applications in films and solubilities of the polymer are disclosed. Copolymers of vinyl acetate with alkyl acrylates, fumarates and maleates are described, as in the conversion of poly(vinyl acetate) to poly(vinyl alcohol) and poly(vinyl acetals). Uses of external plasticizers such as dibutyl phthalate is mentioned but there is no suggestion of blends with other polymers.

Rokicki and Kuran, "The Application of Carbon Dioxide as a Direct Material for Polymer Syntheses in Polymerization and Polycondensation Reactions", J. Macromol. Sci.-Rev. Macromol. Chem. C 21 (1), pages 135–186 (1981), cites the work of Inoue et al., as reported in 1969 on synthesis of poly(propylene carbonate) from carbon dioxide and propylene oxide, and further describes other polymerization and polycondensation reactions involving carbon dioxide, such as the copolymerization of carbon dioxide with alicyclic epoxides, e.g. epoxycyclohexane, using diethylzinc-based catalysts. A survey of operable catalysts is included and complete polymerization conditions are described. Properties of carbon dioxide copolymers are discussed and their solubilities in various solvents are contrasted to the insolubilities of polycarbonates from diepoxides. Blends with other types of polymers are not suggested.

SUMMARY OF THE INVENTION

We have discovered that an excellent property balance can be obtained by combining in blended form a polymer of vinyl acetate which contains greater than 50 wt.% vinyl acetate units with a polymer of propylene carbonate containing greater than 50 wt.% propylene carbonate units. These polymers, which preferably are essentially poly(propylene carbonate) and poly(vinyl acetate), when blended in various proportions ranging from 10 to 90 wt.% of each polymer, exhibit excellent mechanical compatibility as evidenced by the ultimate properties of the mixture. Often the properties of the blends are equal to or higher than the weighted average values of the properties of the constituents. This is prticularly true for energy to break data, which is a measure of the toughness of the polymer. Although mechanical compatibility is not to be expected for most polymer blends, the results on combining poly(propylene carbonate) and poly(vinyl acetate) show excellent mechanical compatibility and synergistic behavior when certain properties or certain compositions are examined.

One of the advantageous forms of the polymer admixture is as a stable polymer emulsion in water containing an emulsifier, a polymer of vinyl acetate, and a polymer of propylene carbonate, as described. Continuous, transparent and flexible films have been obtained by casting using emulsions of this type.

DETAILED DESCRIPTION OF THE INVENTION

Blends of poly(propylene carbonate) and poly(vinyl acetate) exhibit excellent mechanical compatibility which has been demonstrated by measuring the energy to break as well as tensile strength and ultimate elongation of various polymer combinations. The polymer blends show an improved balance of properties over what would be expected from the weighted average values for the constituent polymers. In polymer blends, excellent mechanical compatibility can generally be discerned by measuring the ultimate tensile properties, for example the tensile strength, energy to break and elongation, and if these values are as high as the weighted average values, mechanical compatibility is indicated. In most polymer blends, however, these properties are expected to be below the weighted average values because of incompatibility. The significant positive deviation in energy to break over the weighted average values in the case of polymer blends of this invention is quite unexpectd and is of considerable importance in adhesive applications. The respective polymers can also be used to improve the properties of each other. For example, poly(propylene carbonate) provides an improved tensile strength for poly(vinyl acetate) and the addition of poly(vinyl acetate) improves the ultimate elongation for poly(propylene carbonate).

Poly(vinyl acetate) is a well known article of commerce and has been used in various forms for over four decades. Typical applications include adhesives, sealants, coatings, chewing gum resin base, cellophane coatings and as a polymer precursor for the manufacture of poly(vinyl alcohol). Poly(vinyl acetate) can be prepared by methods commonly utilized for vinyl monomers including emulsion, suspension, solution or bulk polymerization. These reactions are well known and have been noted in various literature references such as Saunders, cited above, and Mark and Raff, "High Polymeric Reactions", Interscience Publishers, Inc., New York, (1941).

In emulsion polymerization of poly(vinyl acetate) and its related copolymers, a series of components are added to build the colloidal system in which polymerization is completed. These include:
1. Polymerization medium (e.g., water)
2. Monomer (vinyl acetate and comonomer if desired)
3. Emulsifying agent (e.g., aliphatic long chain carboxylic or sulfonic acid salts)
4. Protective colloid (e.g., methyl cellulose, hydroxyethyl cellulose, poly(vinyl alcohol))
5. Surface tension regulator (e.g., aliphatic alcohols of medium chain length)
6. Initiator for polymerization (e.g., organic peroxides, persulfates)
7. Chain transfer agents to regulate molecular weight (e.g., dodecyl mercaptan)
8. pH control (e.g., buffers such as phosphates, carbonates, acetates to control or adjust pH of the emulsion)

In suspension polymerization of poly(vinyl acetate), the monomer is dispersed in water containing a suspension agent, such as poly(vinyl alcohol) and an initiator, such as peroxide, is added. After polymerization the unreacted monomer is vaporized and the polymer is filtered and dried. An example of suspension polymerization is given by Rodriguez, cited above.

In solution polymerization the vinyl acetate is dissolved in a solvent which may also dissolve the polymer and an initiator for polymerization is added. After completion of the polymerization, the polymer is recovered by coagulation and the solvent removed by vaporization. Bulk polymerization is not normally practiced for the commercial manufacture of polyvinyl acetate, although with proper provision for heat removal, bulk polymerization could be used.

Although vinyl acetate homopolymers or polymers which are essentially all (for example, 95% or more vinyl acetate) are preferred for this invention, various copolymers of vinyl acetate can be used provided that the comonomer is not present in an amount of 50 wt. % or more. Examples of such comonomers include ethylene, propylene, butene, hexene, vinyl chloride, vinylidene chloride, methylmethacrylate, ethylmethacrylate, N-butylacrylate, methylacrylate, ethylacrylate, 2-hexylacrylate, styrene, acrylonitrile, cyclohexylmethylacrylate, maleic anhydride, vinyl methyl ether, vinyl ethyl ether, acrylic acid and the like. If such copolymers are used, it is better that the vinyl acetate polymer contain at least 75 wt.%, and preferably at least 95 wt.%, vinyl acetate units in order to obtain the best results in the blends with the poly(propylene carbonates).

Although poly(propylene carbonate) has not been commercially available until quite recently, the polymer is well known and its method of production has been reported in various publications, including the Rokicki and Kuran reference cited above, as well as in Rokicki and Kuran, Macromol. Chem., 180, 2153 (1979); Inoue, et al., Macromol, Chem., Rapid. Commun., 1, 775 (1980) and Soga, et al., J. Polymer Science, Polymer Chem. Ed., 17, 415 (1979). The propylene carbonate-containing polymer which is useful in this invention is normally a copolymer formed by the reaction of carbon dioxide with an epoxide such that the resultant polymer contains greater than 50 wt.% of propylene carbonate.

The reaction of $CO_2$ with epoxide (oxirane) containing compounds to yield high molecular weight polymers is usually conducted in an appropriate solvent (e.g. methylene chloride) generally chosen as a polar, aprotic solvent of relatively low donor strength. In order to achieve high molecular weight, the reaction is catalyzed by organometallic catalysts such as diethyl zinc-pyrogallol, carboxylates of zinc, triethyl aluminum-Lewis base, diethyl zinc-$H_2O$. Generally it is preferred to operate the reaction at high pressures and moderate temperatures in order to achieve desired high molecular weights. Pressures in the range 5 to 100 atmospheres are preferred. The conditions and variations of the synthesis of poly(propylene carbonate) have been discussed in detail in the reviews by Rokicki and Kuran cited above. A recent patent by H. S. Sun U.S. Pat. No. 4,783,445 teaches a process for preparing soluble zinc catalysts useful for the preparation of $CO_2$ and oxirane copolymers.

Although the carbon dioxide-epoxide synthesis route is the preferred method of forming poly(propylene carbonate) for use in this invention, other routes, such as the reaction of diols with phosgene can be used. The propylene carbonate units result from the use of propylene glycol in this reaction and this method of preparation is of interest in the formation of block copolymers of poly(propylene carbonate) with polyols, such as ε-caprolactone, propylene oxide, ethylene oxide and the like.

In synthesizing poly(propylene carbonate), the conditions can be varied to provide various levels of propylene oxide units incorporated into the polymer. Copolymers can also be used, such as the propylene carbonate-propylene oxide copolymers, and copolymers with alkylene carbonates are suitable for practicing the invention. Examples of such alkylene carbonates include ethylene carbonate, butene carbonate, cyclohexene carbonate, cyclopentene carbonate and the like. The carbonate copolymers can be prepared using synthesis procedures noted above for poly(propylene carbonate) whereby the incorporation of ethylene oxide, butene oxide, cyclopentene oxide, cyclohexane oxide and the like are combined with propylene oxide for polymerization with $CO_2$. These copolymers can also contain units of the oxide (e.g. butene oxide

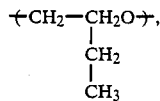

ethylene oxide $-(CH_2-CH-O)-$

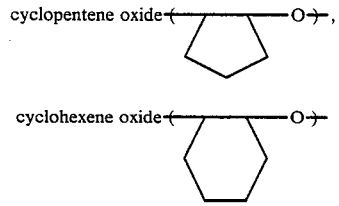

and the like. When such copolymers of propylene carbonate are used, better results in practicing this invention are obtained when the propylene carbonate polymer contains at least 70 wt.%, preferably at least 95 wt.%, propylene carbonate units.

Both the vinyl acetate polymers and the propylene carbonate polymers useful in this invention are normally solid polymers and have molecular weights sufficiently high that tensile properties can be measured on molded specimens. The vinyl acetate and propylene carbonate polymers can be combined in a number of ways, including milling the solid polymers, or combining them as solutions in various organic solvents such as toluene, methylene chloride, tetrahydrofuran, chloroform, acetone, methyl ethyl ketone, ethyl acetate, and the like. Emulsification of poly(propylene carbonate) can provide an emulsion capable of being mixed with poly(vinyl acetate) emulsion for water based applications. Another method of blend preparation could be the addition of poly(propylene carbonate) to vinyl acetate followed by vinyl acetate polymerization. The polymer blends generally contain from 10 to 90 wt.% of poly(propylene carbonate) and 90 to 10 wt.% of the poly(vinyl acetate) or their related copolymers. Preferred compositions are those wherein the blends contain from 20 to 85 wt.% poly(propylene carbonate) and 80 to 15 wt.% poly(vinyl acetate). The typical molecular weight range for poly(vinyl acetate) is from 5,000 to 1,000,000, with a preferred range being from 10,000 to 500,000, while the typical molecular weight range for poly(propylene carbonate) is from 15,000 to 1,000,000 with the preferred range being from 50,000 to 500,000.

The blend compositions of this invention can be modified by incorporating plasticizers, such as those commonly used with poly(vinyl chloride). Examples of such plasticizers are dioctyl phthalate, diisooctyl azelate, triisononyl trimellitate, trioctyl trimellitate, diisononyl phthalate, didecyl phthalate, epoxidized soybean oil, trioctyl phosphate, triphenyl phosphate, tricresyl phosphate, and the like.

The compositions can also contain various reinforcing agents such as fiberglass, carbon fibers, and the like. Also inorganic fillers, such as wollastonite, glass beads, talc, calcium carbonate clay, fumed silica, and the like, can be incorporated into the blends. Other additives, such as pigments, thermal stabilizers, ultraviolet stabilizers, tackifiers, processing aids, flame retardants, impact modifiers, and the like, can be used as is customary in compounding polymeric materials for specific uses.

The polymer blends and compositions which incorporate them can be used in various applications, including coatings, adhesives, or sealants and can also be used in molding objects or extruding films or various profiles. The blends can be applied in solutions involving various organic solvents or as water-based emulsions.

EXAMPLE 1

A blend of 2 gr. of poly(propylene carbonate) and 2 gr. of poly(vinyl acetate) was prepared in 80 ml. of methylene chloride. The solution was single phase. A film cast from this solution was homogeneous with only slightly higher visual haze than films of either of the constituent polymers. The poly(propylene carbonate) was made from $CO_2$ and propylene oxide using zinc-based catalyst and had a melt flow of 13.2 dg/min. at 160° C. (220 psi). The poly(vinyl acetate) was obtained from Scientific Polymer Products (Cat. No. 024) and had a melt flow of 5.5 dg/min. at 160° C. (44 psi). The melt flow was determined using a procedure similar to that described in ASTM-D-1238.

EXAMPLE 2

A blend of 30 gr. of poly(propylene carbonate) with a melt flow of 0.7 dg/min. at 160° C. (44 psi) and 30 gr. of the poly(vinyl acetate) described in Example 1 was prepared in a brabender at 120° C. The resultant material was then compression molded at 140° C. in a 20 mil cavity mold 4"×4". The tensile strength and elongation at break were determined on microtensile specimens cut from the molded plaque and are listed in Table 1.

Samples for tensile testing were die cut from a microtensile bar form. The samples were cut from compression molded 4"×4"×20-25 mil thick specimens. Tensile properties were measured on an Instron using a "C" cell. All samples were measured at a crosshead speed of 2 inches/minute. The yield strength, tensile strength, and ultimate elongation were determined from the resultant stress-strain data. The procedure uilized here is a modification of the procedure listed in ASTM D-638 to determine similar properties.

EXAMPLE 3

A blend of 48 gr. of the poly(propylene carbonate) as described in Example 2 and 12 gr. of the poly(vinyl acetate) as described in Example 1 was prepared in a brabender at 140° C. The resultant blend was then compression molded at 140° C. in a 4"×4" 20 mil cavity mold. The tensile strength and elongation at break were determined on microtensile specimens cut from the molded plaques and are listed in Table 1.

CONTROLS A AND B

Poly(propylene carbonate) as described in Example 2 and poly(vinyl acetate) as described in Example 1 were individually compression molded in a 4"×4" 20 mil cavity mold at 140° C. The tensile strength and elongation at break were determined on microtensile specimens cut from the molded plaque and are listed as controls A and B, respectively, in Table 1. The glass transition temperatures (Tg's) on these samples were determined using a dynamic mechanical spectrometer operating in the torsional mode at 1 Hz, and are listed in Table 2.

EXAMPLE 4

A blend of 30 gr. of poly(propylene carbonate) as described in Example 2 and 30 gr. of an ethylene/vinyl acetate copolymer (40% vinyl acetate) obtained from Scientific Polymer Products was made in a brabender at 120° C. The resultant product was compression molded in a 4"×4" 20 mil cavity mold and microtensile specimens were cut out for testing. The tensile strength and elongation at break were determined as in Examples 2 and 3 and are listed in Table 1. The low elongation at break demonstrates limited mechanically compatibility for this copolymer which had less than 50 wt% vinyl acetate, below the lower limit for the amount of vinyl acetate in copolymers useful in blends with poly(propylene carbonate).

TABLE 1

| Sample Description | Tensile Strength (psi) | Elongation at Break (%) |
|---|---|---|
| Control A (poly(propylene carbonate)) (PPC) | 1235 | 65 |
| Control B (poly(vinyl acetate)) (PVAc) | 1105 | 275 |
| PPC/PVAc 50/50 by wt. | 1325 | 330 |
| PPC/PVAc 80/20 by wt. | 2400 | 200 |
| PPC/EVAc (40% VAc) 50/50 by wt. | 360 | 70 |
| Data determined at 2"/min. strain rate | | |

EXAMPLE 5

A blend of 42 grams of poly(vinyl acetate) and 18 grams of PPC described in Example 2 was prepared in a brabender at 140° C. followed by compression molding at 140° C. in a 4"×4" 20 mil cavity mold. Samples were tested for Tg using a dynamic mechanical spectrometer in the torsional mode and values are given in Table 2. Tensile properties were determined on microtensile specimens cut from the molded plaque, showing a tensile strength of 3840 psi and an elongation at break of 250%.

EXAMPLE 6

A blend of 39 grams of poly(propylene carbonate) as described in Example 2 and 21 grams of poly(vinyl acetate) as described in Example 1 was prepared in a brabender at 140° C. followed by compression molding at 140° C. in a 4"×4" 20 mil cavity mold. Samples were tested for Tg using a dynamic mechanical spectrometer in the torsional mode and values are given in Table 2. Tensile properties were determined on microtensile specimens cut from the molded plaque showing a tensile strength of 3400 psi and an elongation at break of 190%.

TABLE 2

| Sample Description | Tg (°C.) |
|---|---|
| Control A Poly(propylene carbonate) | 40° C. |
| Control B Poly(vinyl acetate) | 34° C. |
| 30/70 PPC/PVAc | 39° C. |
| 65/35 PPC/PVAc | 39° C. |
| Determined by maximum in loss modulus, G" | |

As the tensile properties in Examples 5 and 6 were determined at different times from those in Examples 2-4, testing temperature variation is possible. This condition is critical s the Tg's are near testing temperature. Therefore, comparison with Table 1 values should not be made. The combination of strength and elongation at break are quite good for the blends of Examples 5 and 6, indicative of excellent mechanical compatibility.

In order to compare Examples 5 and 6 to the controls A and B, the samples were retested at the same time and under the same procedure for conditioning. The results are given in Table 3. Differences in tensile properties between equivalent samples taken at different times reflect the conditioning and test condition sensitivity when testing materials near the Tg of the polymers. The data clearly show, however, that the addition of PPC to PVAc leads to improved tensile strength and the addition of PVAc to PPC leads to improved elongation when testing at about 25° C. The area under the stress strain curve is related to toughness (energy to break). The energy to break is consistently and significantly more for the blends than the weighted averaged values for the constituent polymers.

TABLE 3

| Sample Description | Yield Strength psi | Ultimate Elongation (%) | Energy to Break (ft. lb./in$^3$) |
|---|---|---|---|
| Poly(vinyl acetate) | 767 | 314 | 173 |
| 70/30 PVAc/PPC | 2443 | 200 | 195 |
| 35/65 PVAc/PPC | 2427 | 186 | 249 |
| PPC | 4363 | 55 | 94 |

EXAMPLE 7

Blends of poly(propylene carbonate) as described in Example 1 and poly(vinyl acetate) as described in Example 1 were made in a number of different solvents at 10 wt. % solids and equal composition (e.g. 50/50 wt. % PPC/PVAc). The results are listed in Table 4 along with several combinations of poly(propylene carbonate) with polymers of high commercial use to demonstrate the general immiscibility of poly(propylene carbonate) with other polymers. Many of the blends are immiscible in solution and generally exhibit gross phase separation upon film casting. Only poly(methyl acrylate) exhibited cast films with uniformity approaching that observed for poly(vinyl acetate) when blended with poly(propylene carbonate). This behavior is critical for cast film uniformity and would relate to performance characteristics when the above blends would be utilized as adhesives, coatings or sealants applied from solution.

TABLE 4

| Polymer Blended with Poly(Propylene Carbonate) | Solvent | Miscibility at 10% Solids | Cast Film |
|---|---|---|---|
| Poly(vinyl acetate) | CH$_2$Cl$_2$ | Miscible | Uniform, Transparent |
| Poly(vinyl acetate) | CHCl$_3$ | Miscible | Uniform, Transparent |
| Poly(vinyl acetate) | Acetone | Miscible | Uniform, Transparent |
| Poly(vinyl acetate) | Ethyl Acetate | Miscible | Uniform, Transparent |
| Poly(vinyl acetate) | THF | Miscible | Uniform, Transparent |
| Polycarbonate (Lexan 101) | CH$_2$Cl$_2$ | Two Phase | Phase Separated |
| Poly(methyl methacrylate) | CHCl$_3$ | Two Phase | Phase Separated |

TABLE 4-continued

| Polymer Blended with Poly(Propylene Carbonate) | Solvent | Miscibility at 10% Solids | Cast Film |
|---|---|---|---|
| Poly(vinyl chloride) | THF | Two Phase | Phase Separated |
| Polystyrene | $CH_2Cl_2$ | Two Phase | Phase Separated |
| Nitrile Rubber (33% An) | $CH_2Cl_2$ | Two Phase | Phase Separated |
| Chloroprene | $CHCl_3$ | Two Phase | Phase Separated |
| Poly(ethyl methacrylate) | $CH_2Cl_2$ | Two Phase | Phase Separated |
| Poly(vinyl butyral) | $CH_2Cl_2$ | Two Phase | Phase Separated |
| Poly hydroxy ether of Bisphenol A | $CH_2Cl_2$ | Two Phase | Phase Separated |
| Bisphenol A Polyarylate | $CH_2Cl_2$ | Two Phase | Phase Separated |
| Polysulfone | $CH_2Cl_2$ | Two Phase | Phase Separated |
| Poly(ethyl acrylate) | Toluene/$CH_2Cl_2$ | Miscible | Phase Separated |
| Nitrocellulose | THF | Miscible | Phase Separated |
| Cellulose Acetate | THF | Miscible | Phase Separated |
| Cellulose Proprionate | THF | Miscible | Phase Separated |
| Poly($\epsilon$-caprolactone) | $CH_2Cl_2$ | Miscible | Phase Separated |
| Poly(vinylidene fluoride) | DMF | Miscible | Phase Separated |
| Poly(2,6-dimethyl-1,4, phenylene oxide) | $CHCl_3$ | Two Phase | Phase Separated |
| Poly(chlorostyrene) | $CH_2Cl_2$ | Two Phase | Phase Separated |
| Poly(vinyl methyl ether) | $CH_2Cl_2$ | Two Phase | Phase Separated |
| Poly(methyl acrylate) | Toluene/$CH_2Cl_2$ | Miscible | Uniform, Transparent |
| Styrene/acrylonitrile (30% An) | $CH_2Cl_2$ | Two Phase | Phase Separated |
| Vinyl acetate/ethylene copolymer | $CH_2Cl_2$ | Miscible | Phase Separated |
| Poly(etherimide) Ultem 1000 | $CH_2Cl_2$ | Two Phase | Phase Separated |
| Polyester: PETG-6763 | $CH_2Cl_2$ | Two Phase | Phase Separated |
| Poly(isobutyl methacrylate) | $CH_2Cl_2$ | Two Phase | Phase Separated |
| Styrene/allyl alcohol copolymer | $CH_2Cl_2$ | Two Phase | Phase Separated |

EXAMPLE 8

Thirty grams of the poly(propylene carbonate) of Example 2 were dissolved in 100 ml of methylene chloride. Two grams of Igepal 630 CO and 2 grams of Siponate X-200 wer added to 100 ml. of water. The poly(propylene carbonate) solution was slowly poured into the water/surfactant mixture and the resulting mixture was rapidly stirred in a Waring blender.

Thirty grams of the poly(vinyl acetate) of Example 1 were dissolved 100 ml. of methylene chloride. Two grams of Igepal 630 CO a non-ionic surfactant (ethyloxylated nonyl phenol) and 2 grams of Siponate X-200 an anionic surfactant (sodium octyl phenol ether sulfonate) were added to 100 ml. of water. The poly(vinyl acetate) solution was slowly poured into the water/surfactant mixture and the resulting mixture was rapidly stirred in a Waring laboratory blender.

A 50/50 blend by volume of the poly(propylene carbonate) emulsion and the poly(vinyl acetate) emulsion was prepared by simple mixing. This blend was placed under vacuum to remove most of the methylene chloride and to remove part of the water to attain a higher solids level. After devolatilization, the emulsion was stable and the viscosity was quite low. A film cast from the emulsion was continuous, transparent and flexible.

EXAMPLE 9

Melt flow data were obtained on the various blends noted in Examples 2, 3, 5, 6 and Controls A and B. These results were obtained using a Tinius-Olsen Melt Index Apparatus with a procedure similar to that noted in ASTM-D-1238. The results are listed in Table 5. The melt flow data demonstrated that the viscosity of the blends is intermediate between the constituent unblended polymers. The melt flow stability of the blend is the same as the constituent polymers thus indicating no adverse stability problems at 160° C. (the temperature around where these blends would be most likely be extruded or injection molded).

TABLE 5

MELT FLOW RESULTS

| Polymer | T(°C.) | Mf (10) (Dg/Min.) | Mf (30) (Dg/Min.) | Mf (30)/Mf (10) |
|---|---|---|---|---|
| PPC Control A | 160 | 0.69 | 0.73 | 1.06 |
| PVAc Control B | 160 | 5.48 | 5.05 | 0.92 |
| PPC/PVAc (50/50) Example 2 | 160 | 2.28 | 2.51 | 1.10 |
| PPC/PVAc (80/20) Example 3 | 160 | 0.87 | 0.94 | 1.08 |
| PPC/PVAc (30/70) Example 5 | 160 | 2.85 | 2.89 | 1.01 |
| PPC/PVAc (65/35) Example 6 | 160 | 1.43 | 1.61 | 1.12 |

EXAMPLE 10

A sample of poly(ethylene carbonate) (melt flow=1.6 dg/min. at 180° C., 44 psi and melt flow=2.14 dg/min. at 160° C, 440 psi) was blended with poly(vinyl acetate) (2 grams each) in $CH_2Cl_2$. The resultant solution at 10% solids was hazy indicating phase separation.

A sample of poly(butylene carbonate) (melt flow=0.41 dg/min. at 180° C., 44 psi) was blended with poly(vinyl acetate) (2 grams each) in $CH_2Cl_2$. The resultant solution at 10 weight % solids was clear, the cast film from this solution was phase separated.

A blend of poly(cyclohexene carbonate) and poly(vinyl acetate) was also two phase at 10% solids in a $CH_2Cl_2$ solution. Thus poly(propylene carbonate) appears to exhibit improved miscibility with poly(vinyl acetate) over poly(ethylene carbonate), poly(butylene carbonate) or poly(cyclohexene carbonate).

These and various other aspects and embodiments of our invention can be practiced without departing from the spirit or scope thereof.

We claim:

1. A composition comprising a blend of (a) vinyl acetate homopolymer or a copolymer containing greater than 50 weight percent vinyl acetate units and (b) propylene carbonate homopolymer or a copolymer containing greater than 50 weight percent propylene carbonat units wherein said blend contains 10 to 90 weight percent of said vinyl acetate polymer and 90 to 10 weight percent of said propylene carbonate polymer.

2. The composition of claim 1 wherein said vinyl acetate polymer contains at least 75 weight percent vinyl acetate units and said propylene carbonate polymer contains at least 70 weight percent propylene carbonate units.

3. The composition of claim 1 comprising a blend of poly(vinyl acetate) and poly(propylene carbonate).

4. The composition of claim 3 wherein said blend contains 10 to 90 weight percent poly(propylene carbonate) and 90 to 10 weight percent poly(vinyl acetate).

5. The composition of claim 1 wherein said polymer of propylene carbonate is a copolymer derived from carbon dioxide with propylene oxide and containing up to 30 weight percent propylene oxide units.

6. A stable polymer emulsion comprising water, emulsifier, and the polymer blend of claim 1.

* * * * *